United States Patent [19]
Smith

[11] Patent Number: 5,921,025
[45] Date of Patent: Jul. 13, 1999

[54] SELF-WATERING PLANT POT

[75] Inventor: Gregory J. Smith, 16181 E. Belleview Dr., Aurora, Colo. 80015

[73] Assignee: Gregory J. Smith

[21] Appl. No.: 09/008,876

[22] Filed: Jan. 20, 1998

[51] Int. Cl.⁶ ................................................. A01G 29/00
[52] U.S. Cl. .................................. 47/79; 47/81; 47/48.5
[58] Field of Search ................................. 47/79, 81, 48.5

[56] References Cited

U.S. PATENT DOCUMENTS

| | | | |
|---|---|---|---|
| 1,940,044 | 12/1933 | Brandt | 47/38 |
| 2,172,514 | 3/1939 | Lockyer | 47/38 |
| 2,638,716 | 1/1953 | Luipersbek | 47/38 |
| 3,243,919 | 4/1966 | Carlson | 47/38 |
| 3,739,524 | 6/1973 | Rose | 47/38.1 |
| 3,800,471 | 4/1974 | Adams | 47/79 |
| 4,023,305 | 5/1977 | Harschel | 47/79 |
| 4,171,593 | 10/1979 | Bigglestone | 47/79 |
| 4,183,175 | 1/1980 | Magee | 47/79 |
| 4,219,967 | 9/1980 | Hickerson | 47/72 |
| 4,236,351 | 12/1980 | Smith | 47/79 |
| 4,527,354 | 7/1985 | Sellier | 47/81 |
| 4,791,755 | 12/1988 | Bilstein | 47/79 |
| 4,962,613 | 10/1990 | Nalbandian | 47/79 |
| 4,993,186 | 2/1991 | Immonen | 47/79 |

FOREIGN PATENT DOCUMENTS 2 127 267  4/1984  United Kingdom .

*Primary Examiner*—Thomas B. Will
*Assistant Examiner*—Arpad Fabian Kovacs
*Attorney, Agent, or Firm*—Greenlee, Winner & Sullivan, P.C.

[57] ABSTRACT

A self-watering plant pot consisting of an outer pot, a liner of translucent or semi-translucent material that fits within the outer pot, a soil platform assembly that divides the liner into a soil compartment and a water reservoir, an optional float positioned in the water reservoir, and a water delivery channel for allowing water and air to be introduced into the water reservoir. The water delivery channel can be a water delivery tube extending upward from the soil platform. The outer pot is typically opaque and includes a side window opening near its base. The water level in the water reservoir and, if a float is employed, the position of the float are visible through the liner and window opening in the outer pot. Water is conveyed from the water reservoir to the soil via capillary action.

20 Claims, 8 Drawing Sheets

SELF-WATERING PLANT POT

BACKGROUND-FIELD OF THE INVENTION

This invention relates to self-watering plant pots, specifically to self-watering pots with a water reservoir formed in the base of the pot.

BACKGROUND-DESCRIPTION OF PRIOR ART

Devices for self-watering of potted plants are well-known in the art. These devices are useful for maintaining soil moisture, particularly for long periods, and help prevent the over- or under-watering of plants. Improper watering is the most frequent cause of plant mortality. The most common type of self-watering pot consists of a soil container, e.g., a pot, with a built-in reservoir in its base for holding water. The pot is made of a nonporous material, like plastic, so the water in the reservoir cannot escape. The reservoir is filled via a feed tube or side opening in the pot wall. Water is drawn from the reservoir into the soil via capillary action, through contact of the water with the soil or through a wicking material.

A major drawback of existing self-water pots with reservoirs is the difficulty in determining the water level in the reservoir. The prior art shows many arrangements that use a float mechanism to indicate the water level in the reservoir. See, for example, U.S. Pat. No. 3,739,524 to Rose (1973); U.S. Pat. No. 4,171,593 to Bigglestone (1979); GB Patent 2,127,264 to Carlson (1984); U.S. Pat. No. 4,527,354 to Sellier (1985); and U.S. Pat. No. 4,993,186 to Immonen (1991). These patents disclose various combinations or systems of floats attached to stems. The float and attached stem rise and fall with the reservoir water level. The stem extends above the water reservoir and is visible through the feed tube or a side opening. The user infers the quantity of water in the reservoir by the position of the stem.

Such float systems suffer from a number of disadvantages:

a. They are complex, composed of several parts, increasing manufacturing costs and risk of part failure during operation;

b. The float and stem assembly must be aligned with the feed tube prior to operation, further increasing manufacturing costs or decreasing the ease with which a user can place the pot in operation;

c. These designs require a vertical or limiting design option, for example, a nearly vertical feed tube of a size adequate to accommodate the float mechanism, limiting design options, for example, precluding the use of less vertical feed tube angles and configurations, flexible or smaller feed tubes;

d. The float must support the weight of the stem assembly above it, while resting on only a small portion of the available water surface in the reservoir. This, combined with the potential friction between the stem and feed tube, increases the risk of malfunction during operation;

e. It is difficult to visually confirm that the float is, in fact, resting on the surface of the water and has not jammed or sunk; and f. The stem protruding from the feed tube detracts from the aesthetic appeal of the pot.

Another method used to determine the water level in the reservoir of self-watering pots is by incorporation of a clear window into the side of the reservoir, as disclosed in U.S. Pat. No. 3,243,919 to Carlson (1966); U.S. Pat. No. 2,638, 716 to Luipersbek (1953); and U.S. Pat. No. 2,172,514 to Lockyer (1939). The windows described in these patents all suffer the following drawbacks:

a. They require the manufacture of a small window, alignment and attachment of the window with a window hole, and a water-tight seal during the manufacturing process, increasing manufacturing costs; and b. The window seal may leak, creating an additional risk of malfunction.

Addition of a float to improve the visibility of water level in a window is disclosed in U.S. Pat. No. 4,219,967 to Hickerson (1980), which shows a small float contained within an enclosure behind the window. This design, however, retains the drawbacks of the previously mentioned window approaches. It also requires additional parts for the float enclosure and the float and float enclosure must be aligned during manufacturing. The additional parts and alignment procedure needed for the float and its enclosure also increase manufacturing costs.

Another approach allowing determination of the water level in the reservoir is to construct a self-watering pot with a clear or translucent reservoir. Examples of this approach include pots that are translucent or pots having a separate reservoir that is translucent. Such designs are disclosed in U.S. Pat. No. 4,183,175 to Magee (1980); U.S. Pat. No. 4,236,351 to Smith (1980); and U.S. Pat. No. 4,962,613 to Nalbandian (1990). Such designs have the following drawbacks:

a. If a separate translucent base is used, it is another part and requires attachment or alignment to the soil container portion of the pot. These requirements increase manufacturing cost and/or complexity;

b. If a separate translucent base is used, the joint between the base and the soil container portion of the pot may leak;

c. The water in a self-watering pot is always somewhat discolored because of the proximity of soil and water, and the existence of openings between the soil compartment and reservoir. In self-watering pots with translucent reservoirs, the dirty water is highly visible, detracting from the aesthetic appeal of the device; and d. In an entirely translucent self-watering pot, the soil is also visible and, by definition, no other decorative alternatives for the device are available. These factors detract from the aesthetic appeal and limit the color choices available for the article.

A different approach to showing the water level in a plant pot is disclosed in U.S. Pat. No. 1,940,044 to Brandt (1933), which discloses a clear external tube extending upward from the base of the pot and connected to a water reservoir. The level of water in the reservoir can be observed in the tube. The disadvantages of Brandt are similar to those of the pots with window systems and translucent water reservoirs discussed above and include the need for several parts, proper alignment of these several parts during manufacturing, and the need for a water-tight seal. Additional disadvantages of Brandt include the fragility of an external tube and the visibility of discolored water in the tube, such water having been discolored via its required contact with soil. Prominent display of visible discolored water detracts from the aesthetic appeal of a pot.

Yet another approach to determining water level in the reservoir is to provide an opening in the side of the pot near the top of the reservoir. It is possible to observe the water level through this side opening, eliminating the need for a float and stem assembly or a window. The reservoir can also be filled via the side opening, eliminating the need for a fill tube. However, side-filling designs have a number of disadvantages. The water level must be observed from above and to the side, via a small opening, and consequently, is difficult to see. Such designs are also difficult to fill, are easily overfilled, resulting in spillage, and are easily spilled when moved, tipped or jostled. This pot design requires space in the planter to allow water filling decreasing the amount of soil and water that a pot of a given size can hold.

Another major drawback of most existing self-watering pots is that they cannot use porous or semi-porous materials for the pot exterior, such as clay, a popular flower pot material. Porous or semi-porous material cannot be efficiently used in such self-watering designs because the base of the pot is used for the water reservoir. When water is stored in a porous or semi-porous pot, it rapidly diffuses through the pot material and the reservoir benefit is lost. Such water diffusion can also cause water damage to the surface under the base of the pot. As a result, present self-watering pots are preferably made entirely of nonporous material, usually plastic. These material limitations restrict the decorative options available in self-water pots, compared to the options available in regular flower pots.

The prior art suggests that nonporous self-watering pots may be placed within decorative outer pots, presumably to obtain more pleasing aesthetics. U.S. Pat. No. 4,962,613 to Nalbandian (1990) describes placing a self-watering pot with a reservoir made of translucent material into a decorative outer pot. The designs must also dedicate a significant amount of space at the level of the side opening to accommodate access to the reservoir. Such an outer decorative pot, however, places limitations on the ability to determine the water level of the reservoir. The Nalbandian pot either needs to be removed from the decorative pot in order to determine the water level, which is generally inconvenient and impractical for pots of a larger size, or the decorative pot must be sufficiently large to enable the user to see the transparent reservoir.

SUMMARY OF THE INVENTION

It is an object of the invention to provide a self-watering pot with an improved means for accurate visual measurement or detection of the water level in a the reservoir within the pot. It is a further object of the invention to provide a self-watering pot where detection of reservoir water level requires a minimum of component parts and minimal relative alignment of component parts. Furthermore, the expedients employed to allow water level detection should not significantly detract from the aesthetic appeal of the pot or limit the decorative potential of the pot.

It is also an object of this invention to provide a self-watering pot with improved ease of filling the water reservoir that does not significantly detract from the aesthetic appeal of the pot.

It is yet another object of this invention to provide a self-watering pot which can employ a porous outer pot without risk of water-damage to the surroundings.

These objects and others are met with the self-watering pot of this invention in which visual access to water level in a generally concealed inner reservoir is provided through an open window in an outer pot into the reservoir. The reservoir is formed in an internal transparent or semi-transparent liner, so that the viewing window requires no water-tight seal to avoid leakage.

In a preferred embodiment, a float device, requiring no special enclosure or alignment and consisting of a single inexpensive part is provided within the reservoir to facilitate visualization of the water level. The float does not require alignment with, support of, or operation through contact with other parts, thereby reducing the cost to manufacture, and reducing the risk of friction of jamming during operation. The pot is also provided with a simple delivery tube extending from the top of the pot into the reservoir for introduction of water and air. A wide variety of sizes, shapes and designs of water delivery channels can be employed to provide ease of filing. In another preferred embodiment, the delivery channel and optional funnel can be compactly folded into the soil platform to facilitate stacking of pots for storage or display.

More specifically, the invention provides a self-watering plant pot having a outer pot with a removable thin, transparent or semi-transparent liner that is placed inside the outer pot. A soil platform is inserted into the liner to form a soil compartment and a water reservoir in the base of the liner. Water communicates between the reservoir and the soil via a well typically filled with soil or a wick extending into the water reservoir from the soil platform. When filled with soil, the well allows watering of the soil via capillary action. A wick will similarly allow watering of soil in the soil compartment by capillary action. The outer pot has a window on its sidewall preferably near its base, allowing the user to see the water level in the reservoir through the liner. The self-watering pot includes a delivery channel to allow filling of the water reservoir after a plant is planted in the pot. The delivery channel can be a straight, angled or flexible tube which can be provided with a funnel or other water directing spout to ease filling. The outer pot is optionally porous and can be decorative. The soil platform is supported at an intermediate level in the pot liner. Support for the platform can be provided in variety of ways, including for example providing support indentations or a support ledge in the liner walls, or providing the platform with one or more support legs or walls. The well extending from the platform into the reservoir may also function to support the platform within the liner.

Further objects and advantages of the invention include the use of an internal pot liner with no side openings to minimize the chance of overfilling or spilling water from the pot and to allow water level detection without prominent display of the water's discolored condition. Still further objects and advantages will become apparent from a consideration of the following descriptions and drawings.

BRIEF DESCRIPTION OF THE DRAWINGS

FIG. 5A illustrates the delivery channel and funnel unfolded and extended for receiving water. FIG. 5B illustrates the delivery channel and funnel collapsed, folded and inserted compactly into a shaped cavity in a preferred embodiment of the present invention.

FIG. 6A illustrates the funnel extended for receiving water and FIG. 6B illustrates the funnel folded for storage.

DESCRIPTION OF THE PREFERRED EMBODIMENTS

Figure 1A:
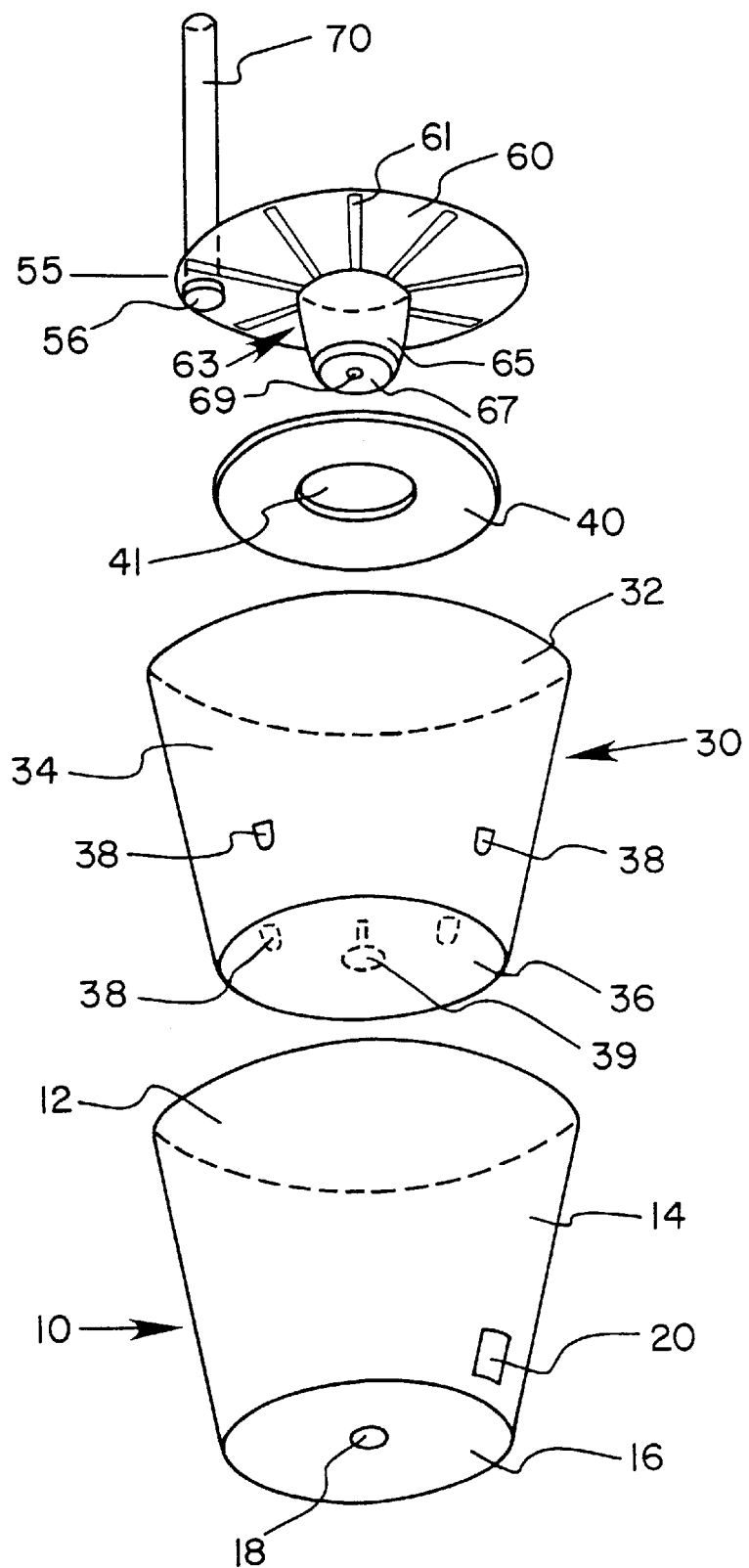
FIG. 1A shows an exploded perspective view of a preferred embodiment of the present invention.

In the accompanying figures, like reference numerals indicate like elements and a reference numeral appearing in more than one figure refers to the same elements.

FIG. 1A illustrates the elements of a self-watering plant pot (or planter) of this invention. The pot has an outer pot 10, a liner 30 shaped for insertion into the outer pot, a soil platform assembly 55 having soil platform 60 and a water delivery tube 70. The pot can be provided with an optional float 40 and a funnel (80, in FIG. 3).

Outer pot 10 can be of various shapes and sizes. The outer pot shapes can be designed to facilitate stacking during shipping and storage; it may be round, square or other shapes. Preferably the pot has a conical shape as shown in FIG. 1, which is a more typical decorative flower pot. As is well-known, containers of this sort can be made with various types of materials, such as clays, ceramics, plastics, fiber or wood, and can be either porous or nonporous material. The external surface of outer pot 10 can also receive all manner and variety of aesthetic decoration available to pots made of such materials, such as carved or inlaid designs, molding, glazes, colorings and other decorations. Such decorations do not affect the various functions of the self-watering pot.

The outer pot 10 has a top opening 12, side wall 14, a pot bottom 16, and an optional hole 18 in its bottom. Inner liner 30 is shaped to fit, and preferably to closely fit within the outer pot. In operation, the inner liner is inserted into the outer pot. Bottom hole 18 may be of any shape or size sufficient to aid in removal or manipulation of liner 30. The bottom hole may also be useful for drainage if the pot is used outdoors. A window opening 20 is provided in the side wall of the outer pot for viewing the water level in the inner liner. Window opening 20 may be of any shape and size sufficient to permit visual inspection of water level. The window is preferably positioned near the bottom of the side wall. Because the water reservoir is formed in inner liner 30, the window requires no water-tight seal. The use of inner liner 30 to form the water reservoir allows the use of porous outer pots without risk of water-damage or leakage to the area surrounding the pot. Further, the use of the inner liner allows the use of outer pots made of decorative materials, such as fiber, fabric, wood and the like, which would be damaged or discolored by contact with water.

Soil platform assembly 55 has a platform 60, a well 63 extending downward from the platform, an opening 56 in the platform for receiving a water delivery tube 70 which functions as the channel for water delivery to the reservoir. The platform surface contains a plurality of openings 61. In the embodiment illustrated in FIG. 1A, the well 63 also serves to support the platform in place within the inner liner.

Figure 1B:
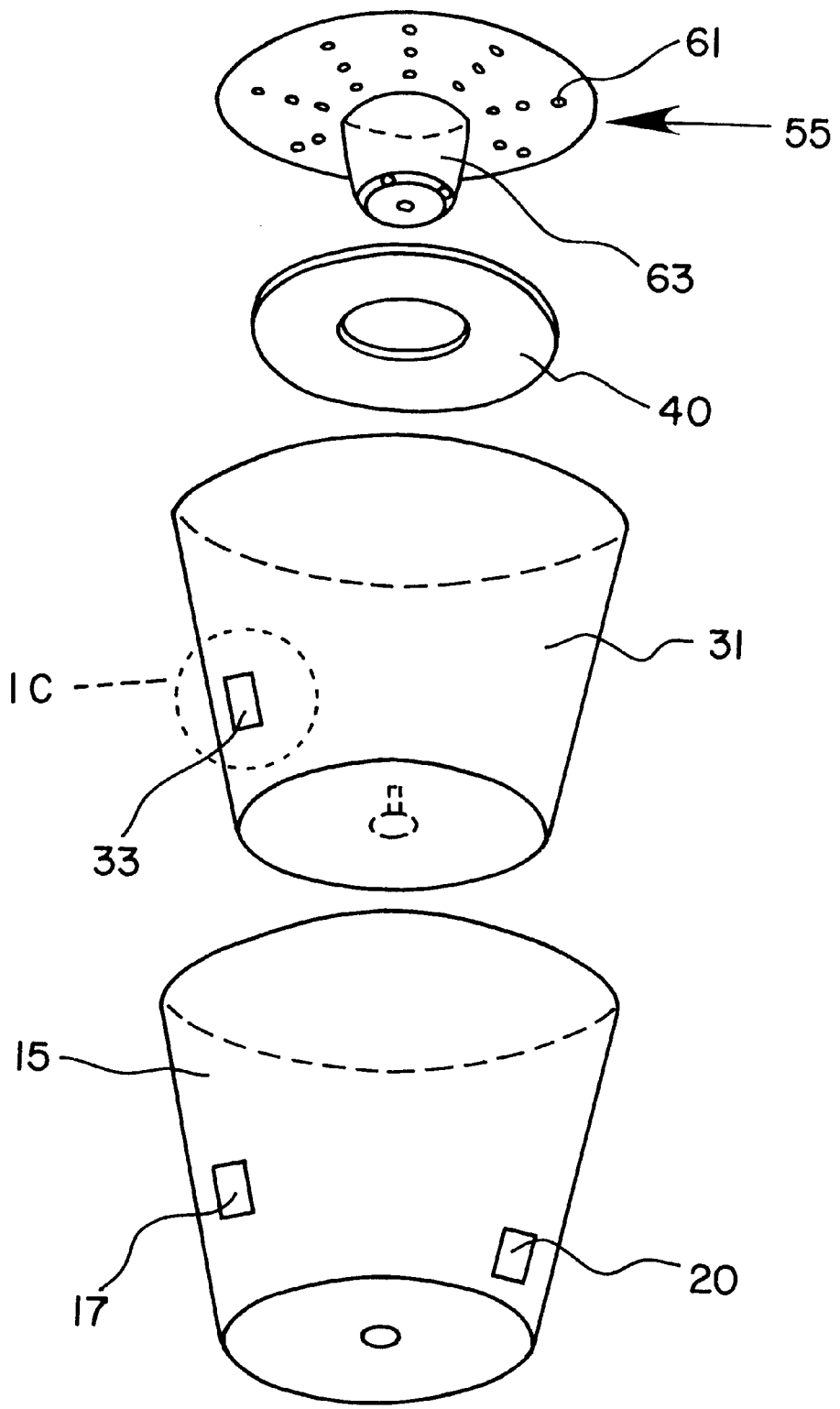
FIG. 1B shows an exploded perspective view of another preferred embodiment of the present invention.

FIG. 1B illustrates an alternative embodiment of a self-watering plant pot of this invention. The pot has an outer pot 15, an inner liner 31, a soil platform assembly 55 and water delivery channel 33. The pot can be provided with an optional float 40.

Outer pot 15 is similar to the outer pot 10 of FIG. 1A but has a second opening or window 17 positioned on the pot above the intended level of the water reservoir to allow water to be introduced into the reservoir.

Figure 1C:
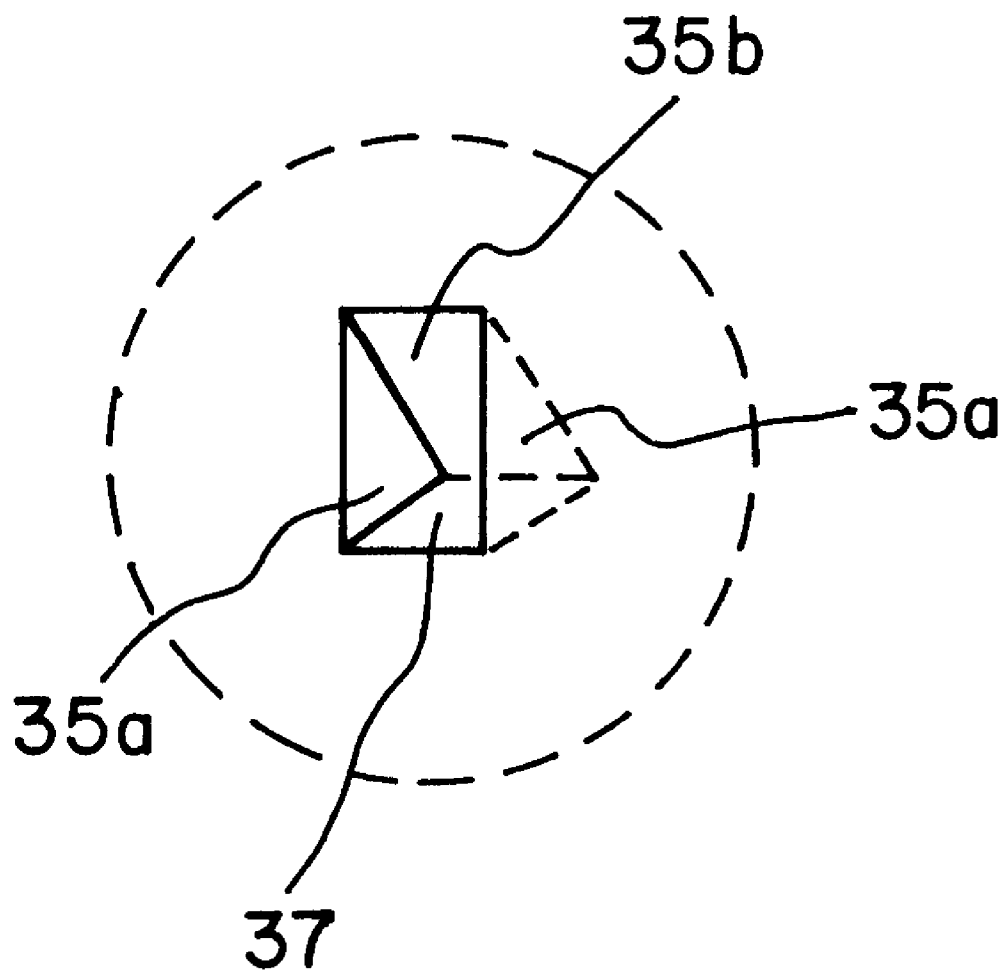
FIG. 1C shows an enlarged view of the water delivery channel of FIG. 1B.

Inner liner 31 is provided with opening 33 positioned to align with window 17 of the outer pot when the liner is inserted into the outer pot. Opening 33 allows fluid communication into the inner liner 31 from outside of the pot and provides a water channel. Preferably downward directed channel 37 is formed on the inside of opening 33 with straight side walls 35a and downward sloping back wall 35b, as shown in FIG. 1C. This structure formed by the three walls directs water downward through channel 37 into the water reservoir. The side 35a and back 35b walls forming the channel can also serve to support soil platform 55 when it is inserted into the inner liner 31 to form separate soil compartment and water reservoir.

Figure 2:
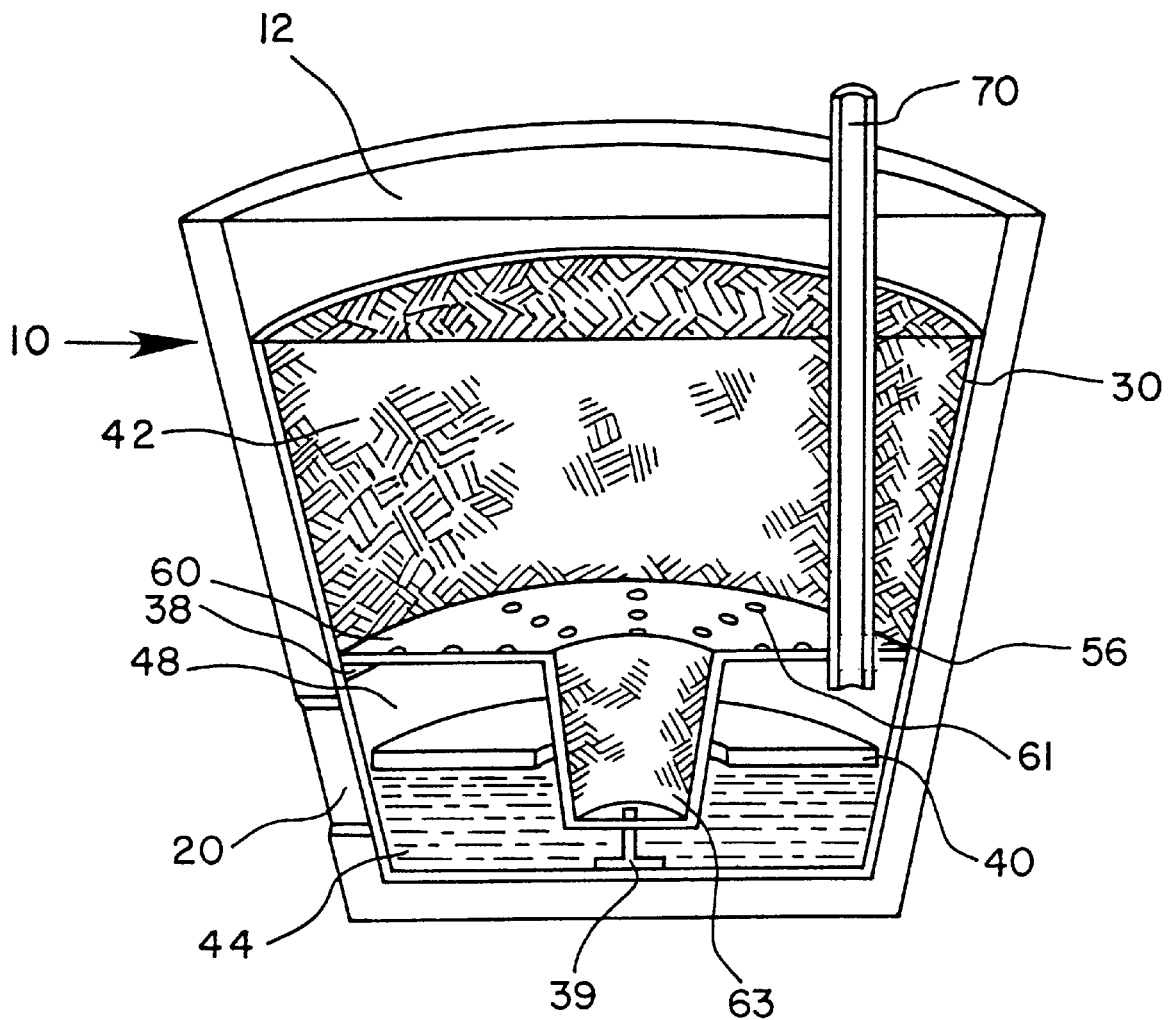
FIG. 2 shows a cross-sectional view of a preferred embodiment of the present invention with pot elements in place.

As illustrated in FIG. 2, the soil platform assembly is inserted into liner 30 to form water reservoir 44 in the base of the inner liner and a separate compartment for holding soil 42 or other potting material for planting. Preferably, the reservoir is only partially filled with water leaving air space 48. The water delivery tube 70 extends upward from the platform preferably to a height above the top of the outer pot. Tube 70 communicates with the water reservoir through an opening 56 in the platform and may extend below the platform. The tube is optionally provide with a funnel 80. The inner liner 30 may be provided with support indentations 38, intermittently around the circumference of the liner, for receiving and supporting platform 60 at a desired height within the inner liner to form the two compartments. Alternatively, a support ledge can be provided to support the platform. The inner liner may also be provided with a support pin 39, attached at the inside liner bottom, which will engage a support indentation 69 in the well bottom to further support the soil platform and ultimately the soil and growing plant in the soil compartment 42 above the soil platform 60.

The water delivery channel 70 is shown as a rigid, straight water tube with a circular perimeter in the illustrations. The water delivery tube can have a perimeter of any shape (oval, circular, or rectangular). The channel can be straight or curved, rigid, or flexible, or contain regions that are flexible. The water delivery tube is preferably attached to the platform. It can be fixed to the platform or the tube and platform may be formed in one piece. The tube can also be removable.

Platform 60 preferably has a plurality of openings extending through the platform to allow communication of air and water vapor between the soil compartment and the air space of the water reservoir. The platform may be perforated over its surface in a selected pattern or randomly. The perforations or openings in the platform may be circular, or other discrete shapes, or may be slits, preferably narrow slits distributed over the surface of the platform. The perforations or openings are preferably sized to avoid passage of large amounts of soil.

Well 63 extends downward from the soil platform into the water reservoir. The well is preferably formed as one piece with the platform, but may be a separate removably attachable element. The well bottom 67 and side wall 65 have at least one and preferably a plurality of openings or perforations (not shown) allowing communication of water from the reservoir into the well. In use, the well is filled with soil and water is taken up from the reservoir through the well by capillary action. Alternatively, the well can be filled with a wicking material, e.g., fabric or other water absorbent material, to mediate water uptake into soil in the soil compartment. The well can be any shape and may generally conform to the shape of the platform. The well illustrated is centrally located in the platform, is conical and its circumference decreases along its length. The well can be oval, rectangular or an irregular shape. The bottom of the well can be flat or curved. Further, the well can be located off center or the well may, for example, have a ring or partial ring shape.

The pot can be provided with a plurality of wells each of which function for communication of water into the soil. One or more of the wells of the soil platform can function as a support leg. The platform may be provided with additional support legs that do not function as wells. A water tube, for example, may extend downward to the bottom of the liner to function as a support leg. In such case, the tube will preferably be perforated on its side wall to deliver water to the reservoir. The well bottom may carry an indentation 38 or notch for receiving a pin or other protrusion positioned on the bottom of the inner liner to facilitate support and alignment of the platform. The tube, well(s), support legs, and platform are typically formed of the same material which can be plastic, ceramic, metal, rubber or the like. The well may be replaced with a strip or portion of wicking material that extends from the platform into the water reservoir.

Liner 30 consists of a top opening 32, side wall 34, a liner bottom 36 and support indentations 38. Liner sides 34 are smooth on the inside and outside to allow for easy insertion into outer pot 10, and to allow free movement of float 40 within liner 30. Support indentations 38 are small indentations in liner sides 34 that protrude inward and are intended to support the weight of and provide proper alignment of soil platform assembly 60. The top of the support indentations 38 divide liner 30 into an upper soil compartment 42 and lower water reservoir 44. Preferably, support indentations 38 are located slightly above window opening 20 so as to provide an air space 48, such space existing even when water surface 44 reaches the top of window opening 20. It is understood that support ledge 38 and liner sides 34 may also incorporate a groove or other detention method (not shown in the drawings) to provide a secure or "snap" fit of soil platform assembly 60 into liner 30. In the illustrated embodiment, liner 30 has no openings other than liner top opening 32.

The window 20 in the outer pot is positioned on the outer pot side wall to coincide with the internally formed water reservoir. The window may be provided with a removable cover if desired. The window area may be provided with markings to assist in determination of water level. The pot optionally has a float 40 in the water reservoir that floats on the water surface and facilitates water level visualization.

The float 40 can be disk-shaped with a central opening 41. The float illustrated in FIGS. 1–2 is a circular disk shaped to conform to the shape of the inner liner 30. A float may have one or more openings to accommodate the well (s) and any other support features. The float of FIGS. 1 and 2 has a single central opening 41 to accommodate well 63. The float may be of various shapes or sizes. Preferably it conforms to the general horizontal cross-sectional shape and size of outer pot 10 and liner 30. The disk is sized and shaped and the opening therein is sized and shaped to allow the disk to freely rise and fall with water level without interference, rubbing or catching on the surfaces of the liner and well. Float 40 rests on water surface and is visible through window opening 20. The float may be made of any buoyant material such as foam. Preferably the float is of a light or bright color, contrasting with the color of outer pot 10 to provide maximum visibility and therefore ease in determining the height of water surface in water reservoir 42. The float provides a clear indication of the height of water surface, making it easy to determine the relative quantity of water in water reservoir, even from a distance.

The float may also consist of one or more objects of any size and shape sufficient to provide a visual indication of the water level in water reservoir 42 portion of liner 30. For example, the float can consist of a plurality of buoyant foam beads.

The alternative self-watering pot of FIG. 1B can be assembled similarly to that of FIG. 1A. Window 30 is positioned to allow fluid access below the platform 60 once the platform assembly 55 is inserted into liner 31. The window 33 and channel 37 of FIG. 1B replace the water delivery tube 70 of FIG. 1A.

Figure 3:
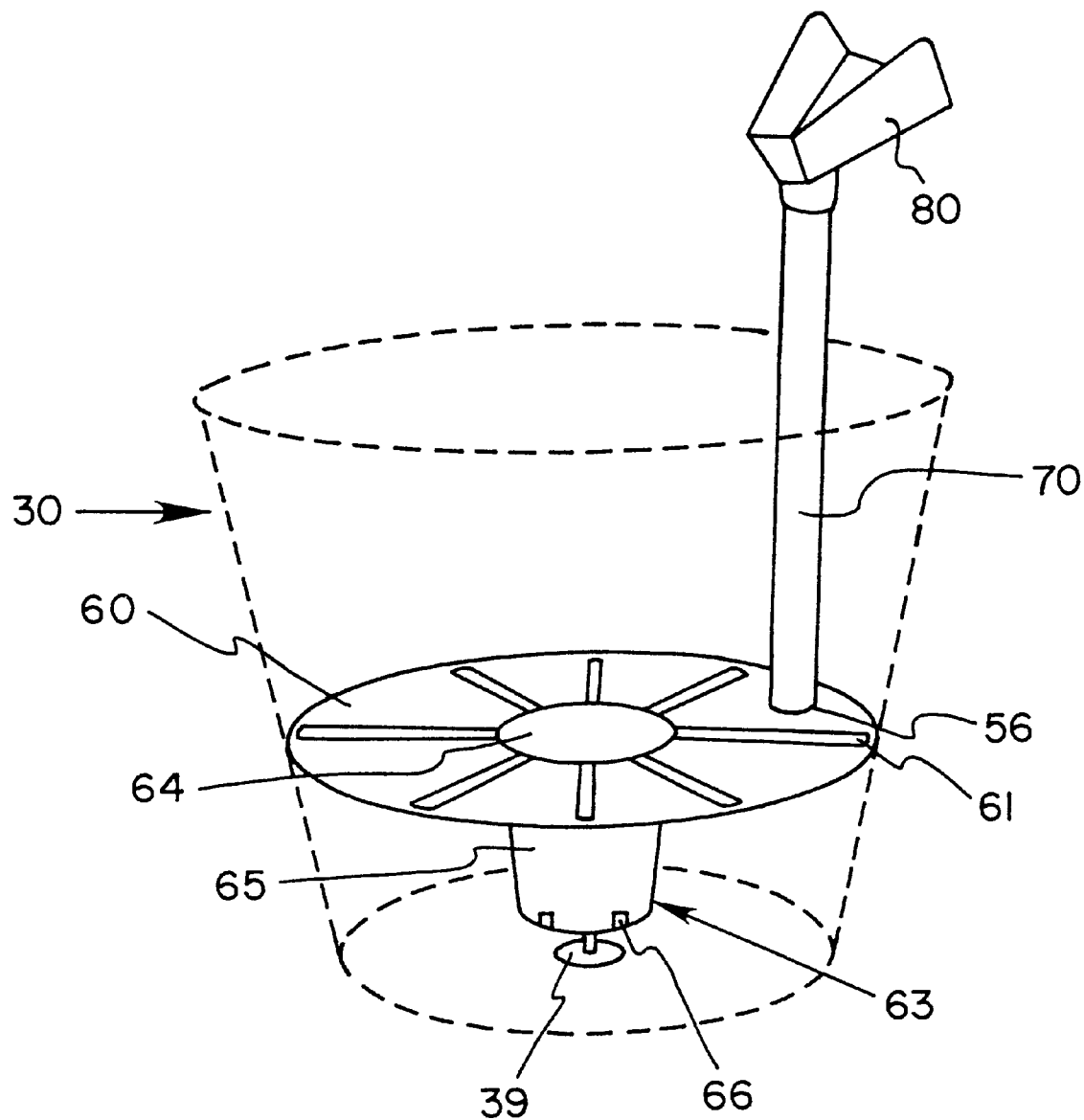
FIG. 3 is a perspective view of the placement of an exemplary soil platform with attached water delivery channel in the inner pot of a preferred embodiment of the self-watering pot of the present invention.

FIG. 3 illustrates in more detail the placement of the soil platform assembly 60 within the inner liner 30 which itself is positioned within the outer pot 10. Water delivery tube 70 is provided with a funnel 80 and is illustrated as extending below the platform 61, but can be flush with the platform. Window 20 is positioned on the side wall of the outer pot at the level of the water reservoir to allow visual detection of the water level in the reservoir. The lower portion of liner 30 is impermeable to water and made of a transparent material, such as plastic, which is sufficiently clear or translucent to allow inspection of water reservoir 44 via window opening 20 in outer pot 10. The figure also illustrates the placement of detention pin 39 at the bottom of the inner liner 30.

The outer pot sides 14 are smooth on the inside and conform to the shape of liner 30 to allow easy insertion of the liner. The liner material is also preferably flexible to allow accommodation of slight variation in the shape of the outer pot 10 and facilitate removal of the liner from the outer pot. The material of liner 30 may be quite thin and therefore inexpensive, as liner 30 is completely surrounded and supported by outer pot 10. The upper portion of the liner which forms the walls of the soil compartment optionally can be provided with openings to allow for drainage.

Figure 4:
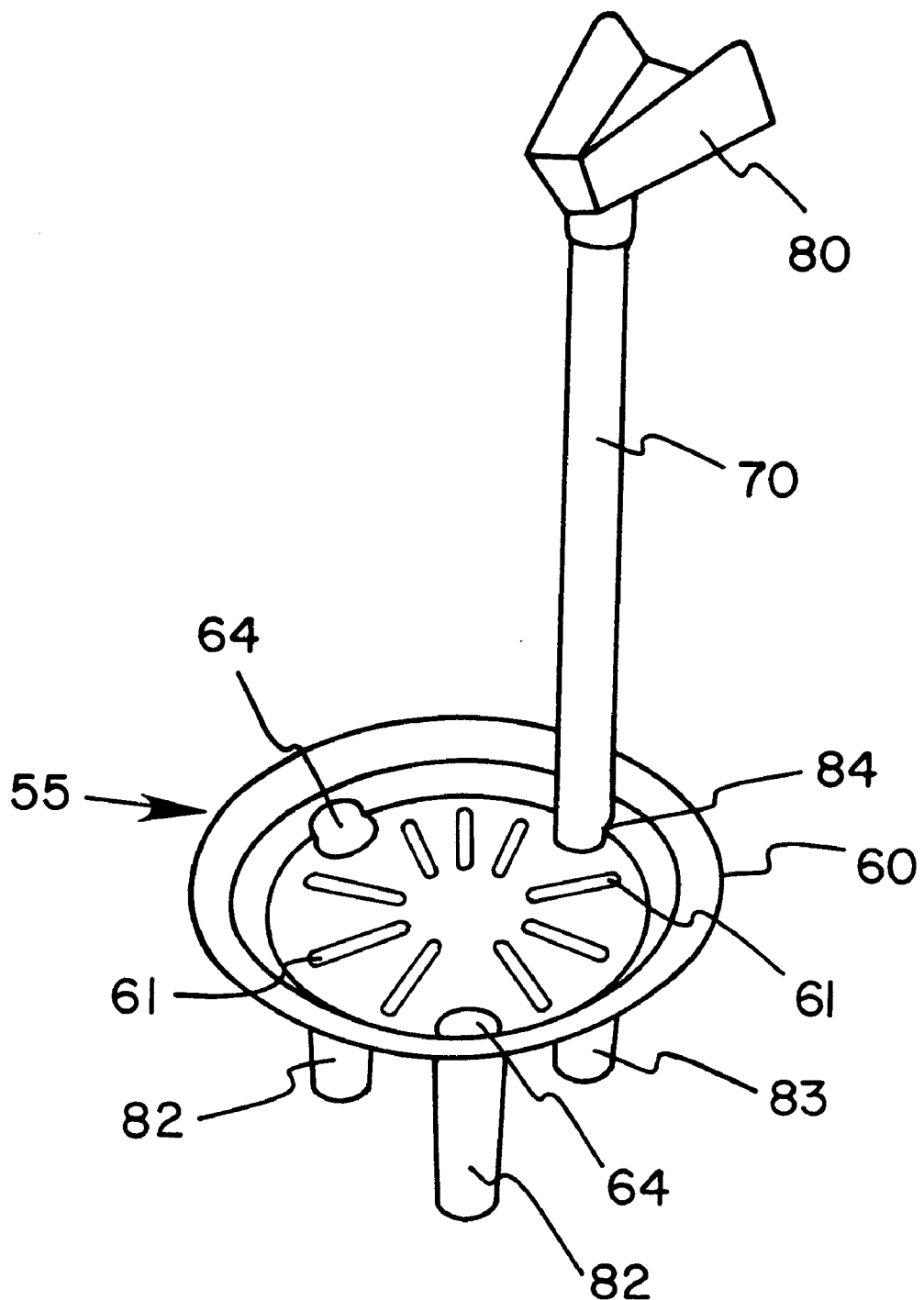
FIG. 4 is a perspective view of an alternative soil platform with a plurality of support legs of the present invention.
Figure 5A:
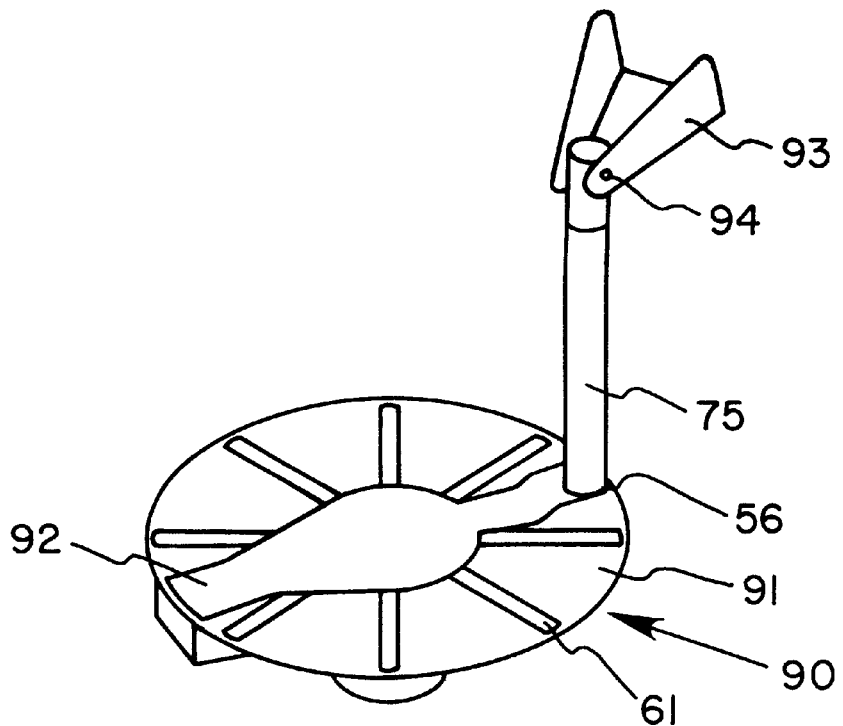
FIGS. 5A and 5B are two views of a collapsible delivery channel and funnel attached to a soil platform.
Figure 5B:
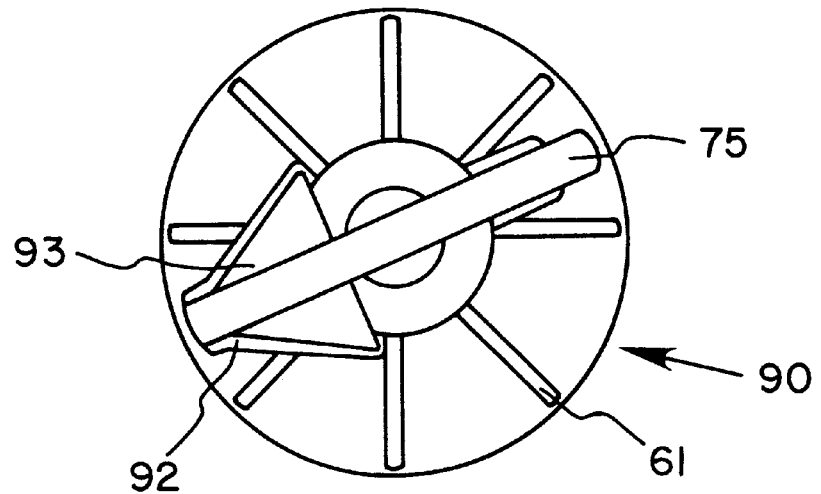

FIGS. 4, 5A and 5B show alternative soil platform assemblies 60. The platform assembly of FIG. 4 has a plurality of support legs which can also function as wells 82 or as a tube for water delivery 83. The water delivery tube 70 is attached to the platform at the opening for support tube 83. Water introduced into tube 70 passes into support tube 83 and into the water reservoir. Similar to well 64 of FIGS. 1–3, wells 83 can be filled with soil and when so filled function to convey water to the soil compartment by capillary action. Soil platform 61 is illustrated as saucer-shaped with a raised rim 85 and a lower base 86.

FIG. 5A (perspective view, opened) and 5b (top view, closed) illustrate a foldable soil platform assembly 90 comprising platform 91, folding water delivery tube 75 and optional folding funnel 93. The water tube is attached to platform 91 such that it can rotate from an open position as in FIG. 5A to a folded or closed portion as in FIG. 5B. In the open position, the water tube engages the opening 56 in the platform for water delivery to the water reservoir. In the closed position, the tube fits into a cavity 92 for receiving the water tube and its optional funnel to form a relatively compact and flat platform surface. The tube 75 can be attached to the platform in a variety of ways, for example employing pins extending from the platform into the tube walls. The tube can then rotate with respect to the platform at the pin connections. The platform and tube can be provided with complimentary features to provide a secure fit when the tube is in the open portion. The folding platform assembly is also provided with a folding funnel 93.

Figure 6A:
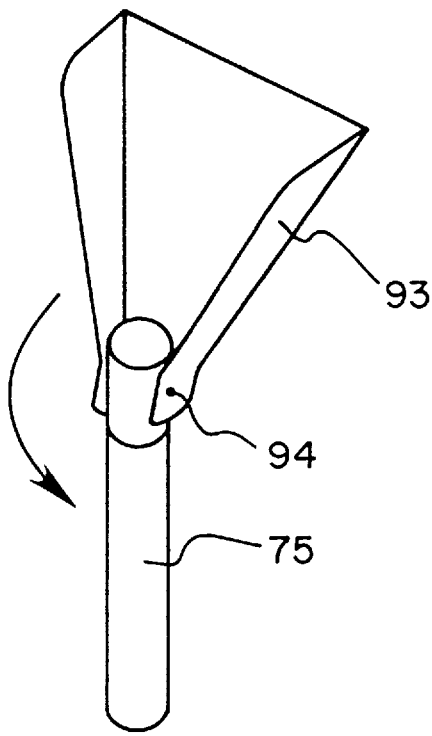
FIGS. 6A and 6B illustrate two views of a funnel attached to a delivery channel in a preferred embodiment of this invention.
Figure 6B:
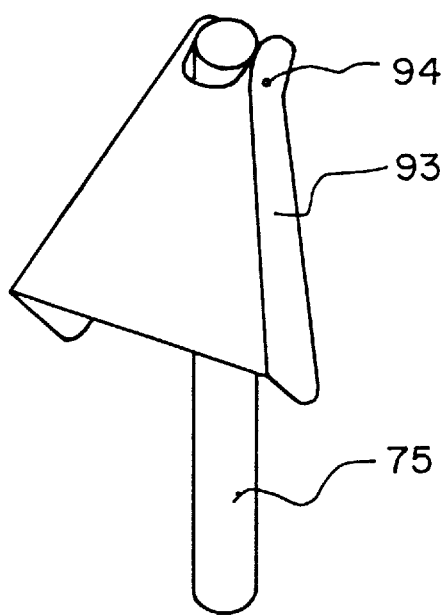

FIGS. 6A and B illustrate a folding funnel 93 of FIGS. 5A and 5B in more detail. The funnel 93 is attached to the water tube 75 such that the funnel can rotate with respect to the water tube from an open position as in FIGS. 5A and 6A to a folded or closed position as in FIGS. 5B and 6B. In the open position, the funnel is positioned with respect to the opening in the water tube for receiving water and conveying the water into the tube. In the folded or closed position the funnel is rotated around and down to receive the water tube to form a compact structure which can be readily received into the cavity 92 in platform 91, as illustrated in FIG. 5B. Funnel 93 may, for example, be attached to the water tube by a pin or pins 94 which allow the funnel to rotate with respect to the tube.

As noted above, various alternative structures are useful as water tubes or water channels in the self-watering pot of this invention. In a specific example, the water tube may be provided with a flexible joint, such as a thin bellow-type connection. This flexible joint allows optional funnel 80 to be positioned within a range of vertical and horizontal planes relative to water tube 70. In such a structure, the funnel may be set by the user at a position and angle so as to allow introduction of water into water tube in a convenient manner. The use of a flexible joint also allows the water tube and its funnel to be hidden with the leaves or bulk of the plant's body when not in use in order to increase aesthetic appeal.

The self-watering pot of this invention may be employed indoors for house plants or as an outdoor planter. When intended for outdoor use, the pot can be provided with a hole or holes placed in the liner at a level slightly above the window so as to allow drainage of excess rain water, thereby preventing excess water from rising into the soil compartment of the pot.

From the above description a number of advantages of the self-watering pot of this invention become evident:

The window provided to observe the water level and/or optional float is inexpensive and reliable because it does not require a special water-tight seal, is not at risk to leak and does not require any special alignment or mounting during assembly or operation.

The optional float which indicates water level in the water reservoir is inexpensive and reliable compared to other float devices because it does not require an intricate, special enclosure, consists of only one inexpensive part, does not require alignment with or contact with other parts to operate properly, does not have to support the weight of other parts, and rests on the majority of available water surface and therefore achieves maximum buoyancy.

A greater variety of materials and decorative effects may be employed to maximize the aesthetic appeal of this planter than was previously possible for self-watering planters since the outer pot is not impermeable to water. All materials and decorative effects available to all other types of flower pots may now be used in the outer pot of this invention.

The user may easily obtain visual confirmation that the float rests on the water surface and therefore accurately indicates the water level in the water reservoir. Further, this water level is observable without prominent display of the water discoloration common in the reservoirs of self-watering planters.

The description and drawings are intended to illustrate the invention and in no way should be construed as limiting the scope of the invention. For example, the window can have many shapes, such as circular, oval, triangular, trapezoid, teardrop or other shapes, or have a scale marked upon it to aid in determining the water quantity in the water reservoir; and the outer pot can contain a plurality of windows for viewing water level. The well can be replaced by a wick, so long as other support for the platform is provided, and can be different sizes and shapes. The optional float can consist of beads or other material that floats on water and can take many different shapes, colors and configurations. The water delivery tube and soil platform assemblies can consist, for example, of a single contiguous part or consist of individual elements permanently attached to one another or elements that are selectively attachable to each other.

Thus the scope of the invention is to be determined by the appended claims and their functional equivalents.

I claim:

1. A self-watering plant pot apparatus having an internal water reservoir and a soil compartment which comprises:
   a. an outer opaque pot with an opening in the side wall of the outer pot;
   b. a transparent or semi-transparent liner shaped to be removably received within the outer pot and having a side wall and a bottom wherein the bottom portion is not permeable to water, said liner extending upward from the base of said outer pot;
   c. a soil platform shaped and sized to be removably received within the liner and which on insertion into the liner is supported therein to form a water reservoir in the bottom portion of the liner below the platform and a soil compartment in the liner above the platform;
   d. a water delivery channel allowing delivery of water from outside of said pot to said internal water reservoir;
   whereby said water level within said reservoir can be observed from the outside of said outer pot through said opening in the outer pot side wall.

2. The apparatus of claim 1 wherein said water delivery channel is a water delivery tube extending upward from said soil platform.

3. The apparatus of claim 2 further comprising a float positioned within said reservoir supported by the water level therein and visible through said opening in the outer pot side wall.

4. The apparatus of claim 3 wherein said float conforms to the shape of the sides of said inner liner.

5. The apparatus of claim 4, wherein said float comprises a plurality of floating elements.

6. The apparatus of claim 3 wherein said platform comprises a well extending into the water reservoir.

7. The apparatus of claim 6 wherein said float is a disk with an aperture for receiving said well.

8. The apparatus of claim 6 wherein said well extends to the bottom of said inner liner and provides support for said platform.

9. The apparatus of claim 8 further comprising a plurality of wells each of which provides support for said platform.

10. The apparatus of claim 9 wherein said float is a disk having a plurality of apertures for receiving said wells.

11. The apparatus of claim 2 wherein a wick extends from the platform into said water reservoir to convey water to said soil compartment by capillary action.

12. The apparatus of claim 2 wherein said liner has a plurality of support indentations for receiving and supporting said platform to form said water reservoir and said soil compartment.

13. The apparatus of claim 2 wherein said liner contains a plurality of openings in its sides above said water reservoir to allow for water to drain.

14. The apparatus of claim 2 wherein the topmost portion of said liner does not extend the full interior height of said outer pot.

15. The apparatus of claim 2 wherein said water delivery tube comprises a flexible joint.

16. The apparatus of claim 2 wherein the water delivery tube comprises a funnel.

17. The apparatus of claim 2 wherein said soil platform comprises a cavity for receiving said water delivery tube and said tube can be rotated with respect to the soil platform and received within said cavity.

18. The apparatus of claim 17 wherein said water delivery tube is provided with a funnel, said cavity is shaped for receiving said water tube and said funnel and said funnel can be rotated with respect to said water tube and the water tube can be rotated with respect to said platform such that the funnel and water tube can be received into said cavity.

19. The apparatus of claim 1 wherein the water reservoir is formed by the side wall and bottom of the liner, below the platform.

20. The apparatus of claim 1 wherein the water delivery channel comprises a second opening on the outer pot positioned thereon above the water reservoir and an opening on the inner liner positioned thereon to align with the second opening on the outer pot.

* * * * *